(12) United States Patent
Huang et al.

(10) Patent No.: US 8,776,095 B2
(45) Date of Patent: Jul. 8, 2014

(54) SCREEN LOCKING METHOD AND MOBILE TERMINAL

(75) Inventors: Qinbo Huang, Shenzhen (CN); Benquan Zhang, Shenzhen (CN); Xin Yu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 139 days.

(21) Appl. No.: 13/258,792

(22) PCT Filed: Oct. 19, 2010

(86) PCT No.: PCT/CN2010/077890
§ 371 (c)(1),
(2), (4) Date: Apr. 20, 2012

(87) PCT Pub. No.: WO2012/003678
PCT Pub. Date: Jan. 12, 2012

(65) Prior Publication Data
US 2012/0222053 A1    Aug. 30, 2012

(30) Foreign Application Priority Data

Jul. 6, 2010 (CN) .......................... 2010 1 0226289

(51) Int. Cl.
*G06F 3/00* (2006.01)
*G06F 3/048* (2013.01)

(52) U.S. Cl.
USPC ............ 719/328; 715/808; 715/741; 715/833

(58) Field of Classification Search
None
See application file for complete search history.

(56) References Cited

U.S. PATENT DOCUMENTS

| 7,231,231 | B2 | 6/2007 | Kokko et al. | |
| 8,539,382 | B2 * | 9/2013 | Lyon et al. | 715/863 |
| 2005/0079896 | A1 | 4/2005 | Kokko et al. | |
| 2009/0228906 | A1 * | 9/2009 | Kelly et al. | 719/328 |
| 2009/0259968 | A1 * | 10/2009 | Hsieh et al. | 715/808 |
| 2010/0223558 | A1 * | 9/2010 | Feng | 715/741 |
| 2011/0047368 | A1 * | 2/2011 | Sundaramurthy et al. | 713/100 |
| 2011/0148752 | A1 * | 6/2011 | Alameh et al. | 345/156 |
| 2011/0214056 | A1 * | 9/2011 | Fleizach et al. | 715/702 |
| 2012/0060123 | A1 * | 3/2012 | Smith | 715/833 |
| 2013/0332885 | A1 * | 12/2013 | Ji et al. | 715/833 |

FOREIGN PATENT DOCUMENTS

| CN | 101183293 A | 5/2008 |
| CN | 101763284 A | 6/2010 |

OTHER PUBLICATIONS

"IntelliScreen—New iPhone App Shows Today Screen Type Info on Lock Screen", PatrickJ, 2008, pp. 1-9.*
"Screen, the virtual Terminal manager for Version 4.1.0", Aug. 2003, pp. 1-120.*

(Continued)

Primary Examiner — Tuan Dao
(74) Attorney, Agent, or Firm — Clark & Elbing LLP

(57) ABSTRACT

The present invention discloses a screen locking method and a mobile terminal, wherein the screen locking method comprises the steps that: a mobile terminal enters into a screen locked state; an interface identifier (ID) of an application interface of an application service set in the mobile terminal is obtained; the application interface indicated by the interface ID is called as a screen locked interface. By the invention, the requirements of a user for the richness and diversity of screen locked interface is satisfied, the availability and friendliness of the mobile terminal device in terms of the screen locked interface is improved and the user experience is improved.

8 Claims, 5 Drawing Sheets

(56) References Cited

OTHER PUBLICATIONS

International Search Report for International Application No. PCT/CN2010/077890, mailed Apr. 14, 2011 (4 pages).

International Preliminary Report on Patentability for International Application No. PCT/CN2010/077890, issued Jan. 8, 2013 (4 pages).
Written Opinion of the International Searching Authority for International Application No. PCT/CN2010/077890, mailed Apr. 14, 2011 (3 pages).

* cited by examiner

SCREEN LOCKING METHOD AND MOBILE TERMINAL

TECHNICAL FIELD OF THE INVENTION

The invention relates to the field of communications, and in particular to a screen locking method and a mobile terminal.

BACKGROUND OF THE INVENTION

With the continuous development of communication technology, the mobile terminal device becomes more and more popular and diversified. The availability and friendliness of the man-machine interface by which the user interacts with the mobile terminal device gets more and more concerns.

In order to avoid a false operation of a user in the non-usage state, at present, most of the mobile terminal devices are provided with a screen locking function. Once the screen is locked, a fixed screen-locked interface is displayed; in the screen-locked state, if a user operates a key by mistake, the mobile terminal device will not respond to the operation, thus, a usage safety is ensured for the user. However, for the user who pursues personalization increasingly, the screen locked interface is simplistic and fixed, and is not humanized; besides, the user can not set the screen locked interface in accordance with his/her interests or can not put the desired information on the screen locked interface, thus the user can not see the screen locked interface set by himself/herself or learn the dynamic information related to the screen locked interface without unlocking.

Therefore, the present screen locking method leads to a fixed and simplistic screen locked interface and can not meet the usage requirements of a user; the experience degree of user is not high.

SUMMARY OF THE INVENTION

The main object of the invention is to provide a screen locking method and a mobile terminal, for solving the problem that the screen fixed interface set by the screen locking method in the relevant technology is fixed and simplistic and that the experience degree of user is not high.

According to one aspect of the invention, a screen locking method is provided, comprising the steps that: a mobile terminal enters into a screen locked state; an interface identifier (ID) of an application interface of an application service set in the mobile terminal is obtained; and the application interface indicated by the interface ID is called as a screen locked interface.

Preferably, the application service includes: an information list service, a mobile dynamic content delivery (DCD) information service and an electronic book service.

Preferably, before the step that a mobile terminal enters into a screen locked state, the method further comprises the steps that: the mobile terminal receiving the operation that a user sets the application interface of the application service as a screen locked interface by using a preset key combination; and saving the application ID of the application service and the interface ID of the application interface.

Preferably, the step that the application interface indicated by the interface ID is called as a screen locked interface comprises the steps that: the mobile terminal sends a start command to the application service indicated by the application ID; the application interface of the application service is called as a screen locked interface according to the interface ID, and the application service is started to execute the preset function, wherein the preset function includes: a prompt function, a dynamic display function or a viewing function.

Preferably, the prompt function is used for prompting the content of the information received by the mobile terminal to the user; the dynamic display function is used for displaying the content of the mobile DCD information received by the mobile terminal for the user; and the viewing function is used for helping the user to view the content of the stored electronic book.

According to another aspect of the invention, a mobile terminal is provided, comprising: a state module used for enabling a mobile terminal to enter into a screen locked state; an obtaining module used for obtaining an interface ID of an application interface of an application service set in the mobile terminal; and a screen locking module used for calling the application interface indicated by the interface ID as a screen locked interface.

Preferably, the application service includes: an information list service, a mobile DCD information service and an electronic book service.

Preferably, the mobile terminal further comprises: a receiving module used for receiving the operation that a user sets an application interface of an application service as a screen locked interface by using a preset key combination; and a saving module used for saving the application ID of the application service and the interface ID of the application interface.

Preferably, the screen locking module further comprises: a sending module used for sending a start command to the application service indicated by the application ID; and a calling module used for calling the application interface of the application service as a screen locked interface according to the interface ID, starting the application service to execute the preset function, wherein the preset function includes: a prompt function, a dynamic display function or a viewing function.

Preferably, the prompt function is used for prompting the content of the information received by the mobile terminal to the user; the dynamic display function is used for displaying the content of the mobile DCD information received by the mobile terminal for the user; and the viewing function is used for helping the user to view the content of the stored electronic book.

By setting a specific application interface selected by a user as a screen locked interface, the present invention is convenient for the user to set a screen locked interface in accordance with the requirements and interests of the user, and to see the application data concerned and the corresponding information when the screen is locked; the invention is simple and practical, is easy to realize the customization of a screen locked interface, extremely meets the requirements of a user for the richness and diversity of a screen locked interface, improves the availability and friendliness of the mobile terminal device in terms of screen locked interface and improves the experience of user.

BRIEF DESCRIPTION OF THE DRAWINGS

For a better understanding of this invention, the drawings described hereinafter are provided to constitute one part of the specification to illustrate this invention in conjunction with the schematic embodiments of this invention but to limit this invention. In the accompanying drawings.

DETAILED DESCRIPTION OF THE EMBODIMENTS

The invention is described below in detail by reference to the drawings in conjunction with embodiments. It should be noted that the embodiments and the characteristics of the embodiments can be combined if no conflict is caused.

Figure 1:
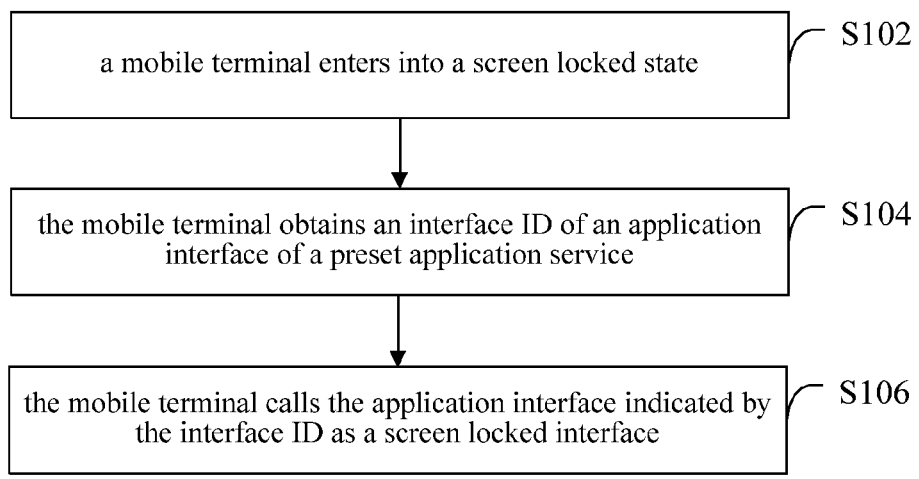
FIG. 1 shows a step flowchart of a screen locking method according to the first embodiment of the invention.

Referring to FIG. 1, a step flowchart of a screen locking method according to the first embodiment of the invention is shown, comprising the following steps that:

Step 102: a mobile terminal enters into a screen locked state;

Step 104: the mobile terminal obtains an interface ID of an application interface of a preset application service;

wherein, the application service includes: an information list service, a mobile DCD information service and an electronic book service.

Step 106: the mobile terminal calls the application interface indicated by the interface ID as a screen locked interface.

In the embodiment, the user first enters into an application interface, which is desired to be set as a screen locked interface, of certain application service, and sets the application interface as a screen locked interface by using specific operating keys (for example, the preset key combination or the preset pressing time of a single key), then the mobile terminal saves the application ID of the application service and the interface ID of the application interface.

When the mobile terminal enters into the screen locked state, the mobile terminal reads the preset application ID, sends a signal to the specified application service through the application ID, starts the preset function of the specified application service and calls the application interface of the application service as a screen locked interface according to the interface ID.

In the relevant technology, the screen locked interface is simplistic and fixed and can not meet the personalized requirements of a user. With the embodiment, a user can set a screen locked interface in accordance with his/her requirements and interests, and can realize a dynamic update of the screen locked interface by calling a relevant application program corresponding to the application service of the screen locked interface so that the user can view the application data concerned and the corresponding information conveniently; therefore, the requirements of a user for the richness and diversity of a screen locked interface is met and the experience of user is improved.

Figure 2:
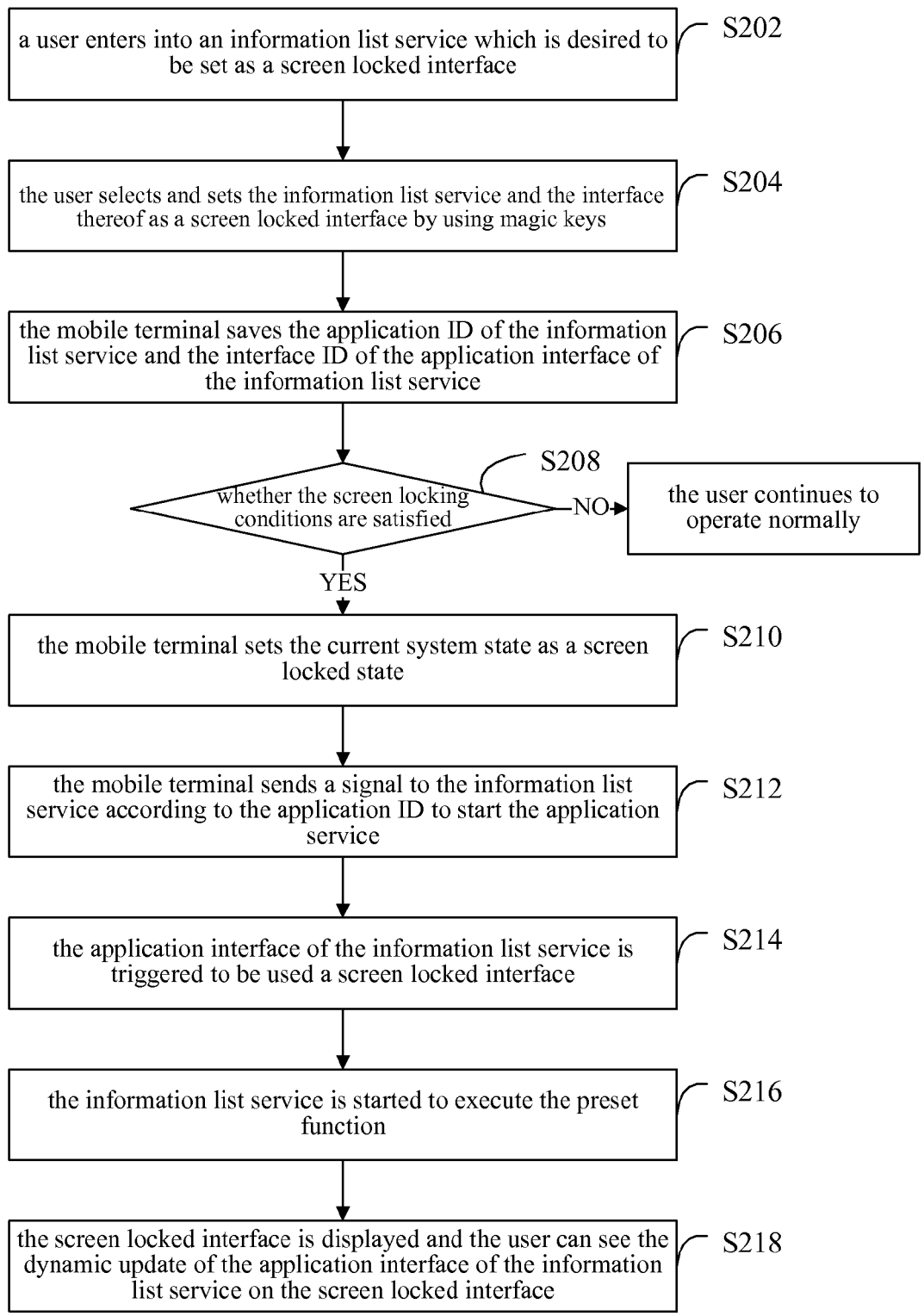
FIG. 2 shows a step flowchart of a screen locking method according to the second embodiment of the invention.

Referring to FIG. 2, a step flowchart of a screen locking method according to the second embodiment of the invention is shown, the application interface of an information list service (for example, an information list of inbox) is used as a screen locked interface, wherein the method comprises the steps that:

Step 202: a user enters into an information list service which is desired to be set as a screen locked interface;

Step 204: the user selects and sets the information list service and the interface thereof as a screen locked interface by using magic keys;

magic key in the prior art is a corresponding relationship between a several-key combination (or the pressing time of a key) and a function and is used for accomplishing the corresponding function through these special key combinations; for example, the function of setting a locked interface in the embodiment can be accomplished by pressing the voice up key and the end call key simultaneously. This function is preset by the system; no further description is needed here. By means of magic key, the setting of a locked interface in the invention is convenient and quick, and is easy to be realized;

Step 206: the mobile terminal saves the application ID of the information list service and the interface ID of the application interface of the information list service;

in Step 206, the mobile terminal saves the application ID and the interface ID into a special location of the file system, wherein the special location can be set by the system, also can be specified by the user;

Step 208: when the screen locking conditions are satisfied, the mobile terminal enters into a screen locked state and Step 210 is to be executed; otherwise, if the screen locking conditions are not satisfied, the user continues to operate normally;

Step 210: the mobile terminal sets the current system state as a screen locked state;

Step 212: the mobile terminal sends a signal to the information list service according to the application ID to start the application service;

Step 214: the information list service is started in the screen locked state and the application interface of the information list service is triggered to be used a screen locked interface;

in Step 214, after the information list service is started, the mobile terminal obtains the interface ID of the information list service and sets the application interface indicated by the interface ID as a screen locked interface; through the interface ID, it is convenient and quick for the mobile terminal to determine the screen locked interface.

Step 216: after the application interface is started, the information list service is started to execute the preset function;

wherein the preset function can be a prompt function used for prompting the content of the short message received by the mobile terminal to the user, the content including the content of an original short message and the content of a newly received short message; the prompt function can be the prompt function of the information list service of the original mobile terminal system, so that the prior art can be utilized to the greatest extent to save cost.

in Step 216: the mobile terminal limits the normal operations of the application interface to achieve an effect of locking a screen, for example, the mobile terminal shields the End Call key, the Back key, the Power off key, the Input key, the Calling key and the Volume key used by the user on the application interface and shields the operations, including photographing and volume adjustment, limited by the screen locking function; however, the operations which do not influence the screen locking function definition are not needed to be limited, for example, the operation of upwards and downwards paddling screen so as to better view the information list.

Step 218: the screen locked interface is displayed and the user can see the dynamic update of the application interface of the information list service on the screen locked interface;

for example, if a new short message is received on the inbox message list interface of the short message, the user can directly see the new information on the information list without unlocking the screen; however, if the user wants to further operate the information, he/she has to unlock the screen to perform the operation.

By means of the above steps of the embodiment, the preset function of the application service corresponding to the screen locked interface is started to realize the dynamic update of the screen locked interface effectively.

After the user sets the application interface in which the user is interested, the system limits partial function of the application interface and sets the application interface as a screen locked interface; this process is meaningful; the user can see the application concerned and the main data information of the application conveniently without unlocking the mobile terminal, such as a mobile phone; therefore, the experience of user is improved.

Figure 3:
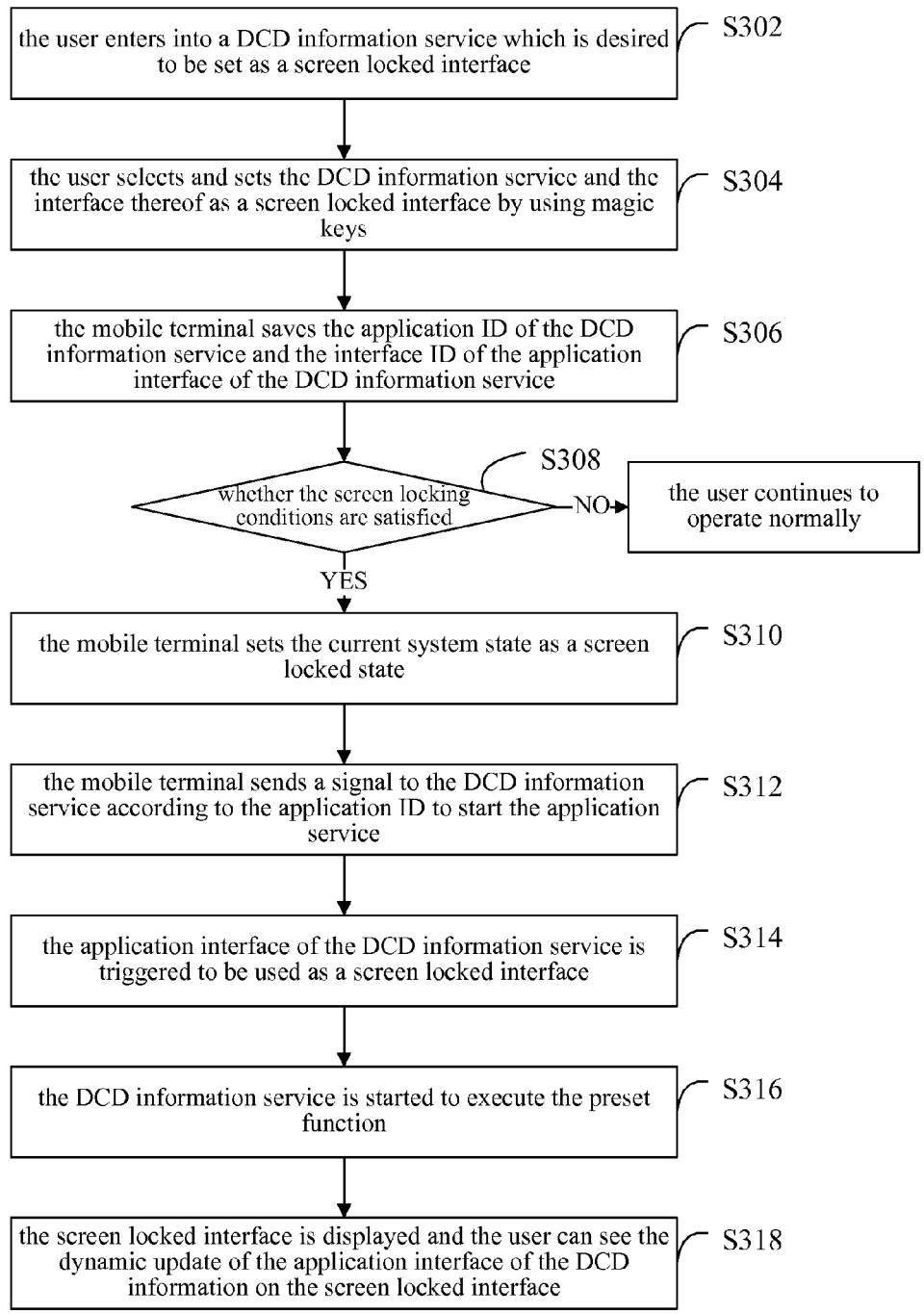
FIG. 3 shows a step flowchart of a screen locking method according to the third embodiment of the invention.

Referring to FIG. 3, a step flowchart of a screen locking method according to the third embodiment of the invention is shown, the application interface of the mobile DCD information service is used as a screen locked interface, wherein the method comprises the steps that:

Step 302: the user enters into a DCD information service which is desired to be set as a screen locked interface;

Step 304: the user selects and sets the DCD information service and the interface thereof as a screen locked interface by using magic keys;

Step 306: the mobile terminal saves the application ID of the DCD information service and the interface ID of the application interface of the DCD information service;

Step 308: when the screen locking conditions are satisfied, the mobile terminal enters into a screen locked state and Step 310 is to be executed; otherwise, if the screen locking conditions are not satisfied, the user continues to operate normally;

Step 310: the mobile terminal sets the current system state as a screen locked state;

Step 312: the mobile terminal sends a signal to the DCD information service according to the application ID to start the application service;

Step 314: the DCD information service is started in the screen locked state, the application interface of the DCD information service is triggered to be used as a screen locked interface;

in Step 314, after the DCD information service is started, the mobile terminal obtains the interface ID of the DCD information service and sets the application interface indicated by the interface ID as a screen locked interface;

Step 316: after the application interface is started, the DCD information service is started to execute the preset function;

wherein the preset function can be a dynamic display function used for displaying the content of the DCD information received by the mobile terminal for the user, the content including the content of original DCD information and the content of newly received DCD information; the dynamic display function can be the dynamic display function of the DCD information service of the original mobile terminal system, so that the prior art can be utilized to the greatest extent to save cost.

in Step 316: the mobile terminal limits the normal operations of the application interface to achieve an effect of locking a screen, for example, the mobile terminal shields the End Call key, the Back key, the Power off key, the Input key, the Calling key and the Volume key used by the user on the application interface and shields the operations, including photographing and volume adjustment, limited by the screen locking function; however, the operations which do not influence the screen locking function definition are not needed to be limited, for example, the operation of upwards and downwards paddling screen so as to better view the information list.

Step 318: the screen locked interface is displayed and the user can see the dynamic update of the application interface of the DCD information on the screen locked interface;

for example, if a new piece of DCD information is received on the interface of the DCD information, the user can directly see the new information without unlocking the screen; however, if the user wants to further operate the information, he/she has to unlock the screen to perform the operation.

Figure 4:
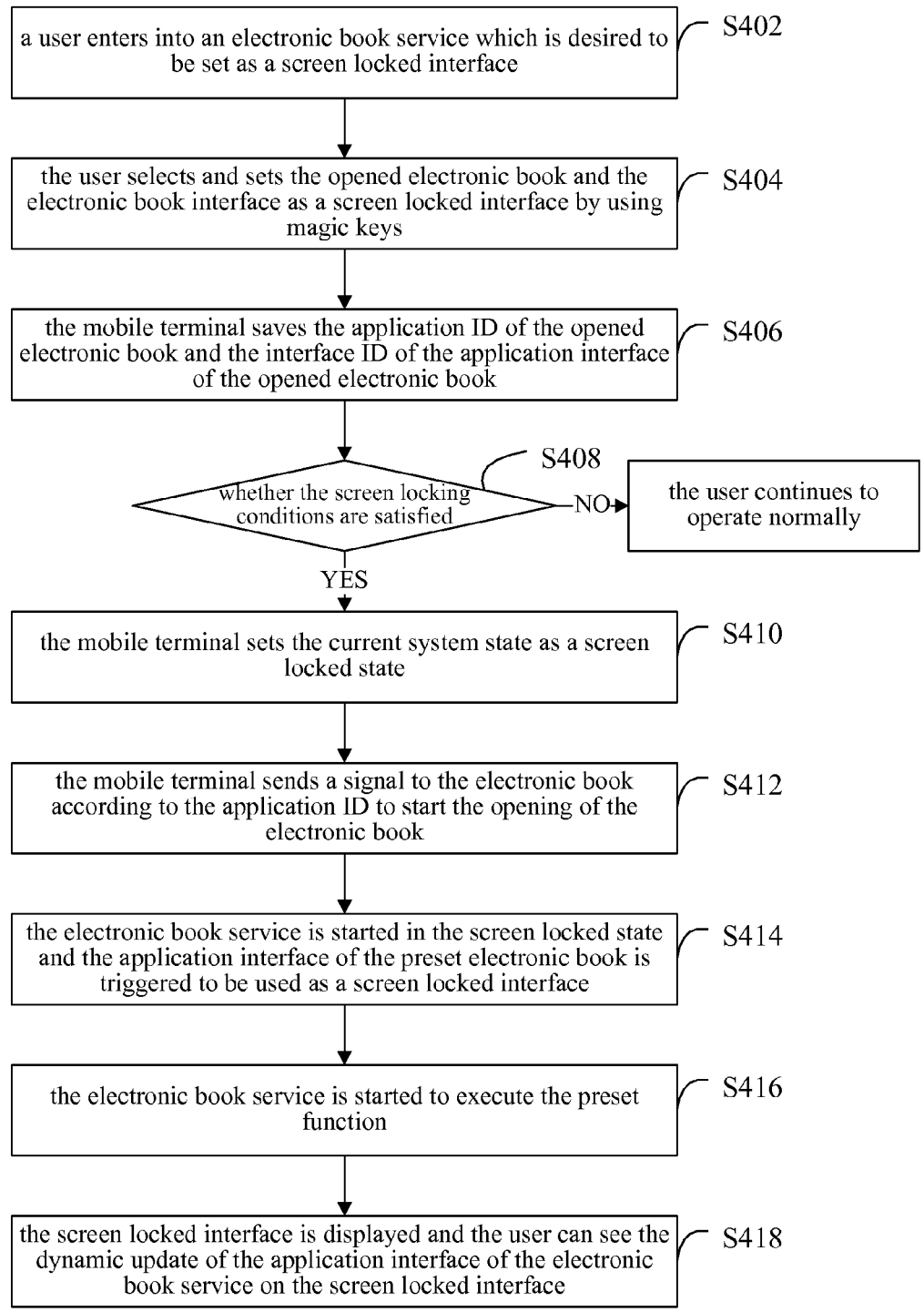
FIG. 4 shows a step flowchart of a screen locking method according to the fourth embodiment of the invention.

Referring to FIG. 4, a step flowchart of a screen locking method according to the fourth embodiment of the invention is shown, the application interface of the electronic book is used as a screen locked interface, wherein the method comprises the steps that:

Step 402: a user enters into an electronic book service which is desired to be set as a screen locked interface;

in Step 402, the user enters into an electronic book service and opens an electronic book file to read and view;

Step 404: the user selects and sets the opened electronic book and the electronic book interface as a screen locked interface by using magic keys;

Step 406: the mobile terminal saves the application ID of the opened electronic book and the interface ID of the application interface of the opened electronic book;

Step 408: when the screen locking conditions are satisfied, the mobile terminal enters into a screen locked state and Step 410 is to be executed; otherwise, if the screen locking conditions are not satisfied, the user continues to operate normally;

Step 410: the mobile terminal sets the current system state as a screen locked state;

Step 412: the mobile terminal sends a signal to the electronic book according to the application ID to start the opening of the electronic book;

Step 414: the electronic book service is started in the screen locked state and the application interface of the preset electronic book is triggered to be used as a screen locked interface;

in Step 414, the electronic book service is started and the preset electronic book is opened, the mobile terminal obtains the interface ID of the electronic book and sets the application interface indicated by the interface ID as a screen locked interface;

Step 416: after the application interface is started, the electronic book service is started to execute the preset function;

the preset function can be a view function used for providing the user with a function for viewing the content of the stored electronic book; the view function can be the view function of the electronic book service of the original mobile terminal system, so that the prior art can be utilized to the greatest extent to save cost.

in Step 416: the mobile terminal limits the normal operations of the application interface to achieve an effect of locking a screen, for example, the mobile terminal shields the End Call key, the Back key, the Power off key, the Input key, the Calling key and the Volume key used by the user on the application interface and shields the operations, including photographing and volume adjustment, limited by the screen locking function; however, the operations which do not influence the screen locking function definition are not needed to be limited, for example, the operation of upwards and downwards paddling screen so as to better view the information list;

Step 418: the screen locked interface is displayed and the user can see the dynamic update of the application interface of the electronic book service on the screen locked interface;

for example, the user can read the content of the opened electronic book by upwards or downwards paddling the screen; however, if the user wants to further operate the electronic book, he/she has to unlock the screen to perform the operation.

Figure 5:
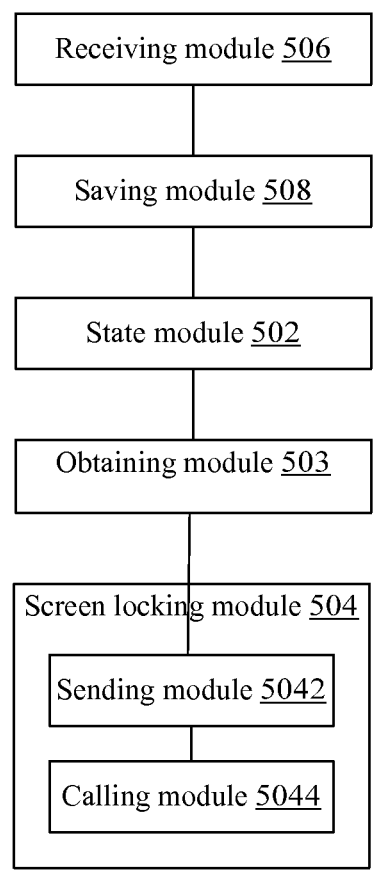
FIG. 5 shows a structure diagram of a mobile terminal according to the fifth embodiment of the invention.

Referring to FIG. 5, a structure diagram of a mobile terminal according to the fifth embodiment of the invention is shown, wherein the mobile terminal comprises:

a state module 502 used for enabling a mobile terminal to enter into a screen locked state; an obtaining module 503 used for obtaining an interface ID of an application interface of an application service set in the mobile terminal; a screen locking module 504 used for calling the application interface indicated by the interface ID as a screen locked interface, wherein the application service may include an information list service, a mobile DCD information service and an electronic book service, etc.

Preferably, the mobile terminal in the embodiment further comprises: a receiving module 506 used for receiving the operation that a user sets an application interface of an application service as a screen locked interface by using a preset key combination; a saving module 508 used for saving the application ID of the application service and the interface ID of the application interface.

Preferably, the screen locking module 504 further comprises: a sending module 5042 used for sending a start command to the application service indicated by the application ID; a calling module 5044 used for calling the application interface of the application service as a screen locked interface according to the interface ID, starting the application service to execute the preset function, wherein the preset function includes: a prompt function, a dynamic display function or a viewing function, wherein the prompt function is used for prompting the content of the information received by the mobile terminal to the user; the dynamic display function is used for displaying the content of the DCD information received by the mobile terminal for the user; the viewing function is used for helping the user to view the content of the stored electronic book.

It should be noted that the application services in the screen locking method and the mobile terminal in the invention are not limited to the information application, the DCD application, the electronic book, the games, etc; the application service further comprises other similar application services. Those skilled in the art can use other similar application services as the screen locked interface by referring to the embodiment of the invention.

Obviously, those skilled in the art should understand that the modules and steps described above can be implemented by a common computer device; the modules or steps can be integrated on a single computing device or distributed on a network composed of a plurality of computing devices; optionally, the modules or steps can be implemented by a programming code executable by a computing device, thus they can be stored in a storage device to execute by a computing device, or manufactured into individual integrated circuit module respectively, or several of them can be manufactured into a single integrated circuit module to realize; in this way, the present invention is not limited to any combination of specific hardware and software.

The above is only the preferred embodiment of the invention and not intended to limit the present invention. For those skilled in the art, various modifications and changes can be made to the present invention. Any modification, equivalent substitute and improvement within the spirit and principle of the present invention are deemed to be included within the scope of the present invention.

What is claimed is:

1. A processor-implemented screen locking method, comprising:
    a mobile terminal entering into a screen locked state;
    obtaining an interface identifier (ID) of an application interface of an application service in the mobile terminal; and
    calling the application interface indicated by the interface ID as a screen locked interface;
    wherein before the step that a mobile terminal enters into the screen locked state, the method further comprises:
    the mobile terminal receiving an operation that a user sets the application interface of the application service as a screen locked interface by using a preset key combination; and
    saving an application ID of the application service and the interface ID of the application interface, the application ID and the interface ID are distinct identifiers.

2. The method according to claim 1, wherein the application service includes: an information list service, a mobile dynamic content delivery (DCD) information service and an electronic book service.

3. The method according to claim 1, wherein the step that calling the application interface indicated by the interface ID as a screen locked interface comprises:
    the mobile terminal sending a start command to the application service indicated by the application ID; and
    calling the application interface of the application service as a screen locked interface according to the interface ID, and starting the application service to execute the preset function, wherein the preset function includes: a prompt function, a dynamic display function or a viewing function.

4. The method according to claim 3, wherein the prompt function is used for prompting the content of the information received by the mobile terminal to the user; the dynamic display function is used for displaying the content of the mobile DCD information received by the mobile terminal for the user; and the viewing function is used for helping the user to view the content of the stored electronic book.

5. A mobile terminal, comprising:
    a hardware processor configured to execute program units stored on a memory, the program units comprising:
    a state module used for enabling the mobile terminal to enter into a screen locked state;
    an obtaining module used for obtaining an interface ID of an application interface of an application service in the mobile terminal; and
    a screen locking module used for calling the application interface indicated by the interface ID as a screen locked interface;
    further comprising a receiving module used for receiving an operation that a user sets the application interface of the application service as the screen locked interface by using a preset key combination; and
    a saving module used for saving an application ID of the application service and the interface ID of the application interface, the application ID and interface ID are distinct identifiers.

6. The mobile terminal according to claim 5, wherein the application service includes:
    an information list service, a mobile DCD information service and an electronic book service.

7. The mobile terminal according to claim 5, wherein the screen locking module further comprises:
    a sending module used for sending a start command to the application service indicated by the application ID; and
    a calling module used for calling the application interface of the application service as a screen locked interface according to the interface ID, starting the application service to execute the preset function, wherein the preset function includes: a prompt function, a dynamic display function or a viewing function.

8. The mobile terminal according to claim 7, wherein the prompt function is used for prompting the content of the information received by the mobile terminal to the user; the dynamic display function is used for displaying the content of the mobile DCD information received by the mobile terminal for the user; and the viewing function is used for helping the user to view the content of the stored electronic book.

* * * * *